United States Patent
Mahalingam

(10) Patent No.: US 9,237,224 B2
(45) Date of Patent: Jan. 12, 2016

(54) TEXT INTERFACE DEVICE AND METHOD IN VOICE COMMUNICATION

(76) Inventor: Padmanabhan Mahalingam, Madras (IN)

(*) Notice: Subject to any disclaimer, the term of this patent is extended or adjusted under 35 U.S.C. 154(b) by 242 days.

(21) Appl. No.: 13/099,701

(22) Filed: May 3, 2011

(65) Prior Publication Data

US 2012/0284024 A1    Nov. 8, 2012

(51) Int. Cl.
*G10L 13/00* (2006.01)
*G10L 13/027* (2013.01)
*G10L 21/057* (2013.01)
*H04M 1/725* (2006.01)
*H04M 1/64* (2006.01)

(52) U.S. Cl.
CPC ........... *H04M 1/72591* (2013.01); *G10L 13/00* (2013.01); *H04M 1/642* (2013.01); *G10L 13/027* (2013.01); *G10L 2021/0575* (2013.01)

(58) Field of Classification Search
CPC ......... G10L 13/00; G10L 13/02; G10L 13/04; G10L 13/043
USPC .................................. 704/258, 260, 270–275
See application file for complete search history.

(56) References Cited

U.S. PATENT DOCUMENTS

| | | | | |
|---|---|---|---|---|
| 4,982,420 A * | 1/1991 | Theis | ............................. | 379/68 |
| 6,044,337 A * | 3/2000 | Gorin et al. | ........................ | 704/1 |
| 6,157,913 A * | 12/2000 | Bernstein | ........................ | 704/275 |
| 6,490,560 B1 * | 12/2002 | Ramaswamy et al. | ........ | 704/250 |
| 6,622,119 B1 * | 9/2003 | Ramaswamy et al. | ............ | 704/9 |
| 6,701,162 B1 * | 3/2004 | Everett | ........................ | 455/556.1 |
| 6,721,706 B1 * | 4/2004 | Strubbe et al. | ................ | 704/275 |
| 6,799,033 B2 * | 9/2004 | Kanefsky | ................... | 455/412.1 |
| 6,941,342 B1 * | 9/2005 | Nelson | .......................... | 709/204 |
| 7,117,152 B1 * | 10/2006 | Mukherji et al. | ............. | 704/235 |
| 7,177,797 B1 * | 2/2007 | Micher et al. | ..................... | 704/9 |
| 7,679,534 B2 * | 3/2010 | Kay et al. | ......................... | 341/22 |
| 7,758,264 B2 * | 7/2010 | Jawerth et al. | ................ | 400/489 |
| 7,881,936 B2 * | 2/2011 | Longe et al. | .................. | 704/257 |
| 8,027,457 B1 * | 9/2011 | Coy et al. | ................ | 379/265.09 |
| 8,537,983 B1 * | 9/2013 | Haggerty et al. | .......... | 379/88.14 |
| 2002/0077822 A1 * | 6/2002 | Case | ............................. | 704/260 |
| 2002/0126097 A1 * | 9/2002 | Savolainen | .................... | 345/168 |
| 2007/0174388 A1 * | 7/2007 | Williams | ...................... | 709/204 |
| 2008/0138135 A1 * | 6/2008 | Gutowitz | ..................... | 400/486 |
| 2008/0141146 A1 * | 6/2008 | Jones et al. | ..................... | 715/753 |
| 2009/0106695 A1 * | 4/2009 | Perry et al. | ..................... | 715/816 |
| 2009/0193334 A1 * | 7/2009 | Assadollahi | .................. | 715/261 |
| 2010/0076760 A1 * | 3/2010 | Kraenzel et al. | ............. | 704/235 |
| 2010/0312833 A1 * | 12/2010 | Rimmer et al. | ............... | 709/204 |

* cited by examiner

*Primary Examiner* — Eric Yen
(74) *Attorney, Agent, or Firm* — Donald R. Boys; Central Coast Patent Agency, Inc.

(57) ABSTRACT

A computerized communication device has a display screen, a mechanism for a user to select words or phrases displayed on the display screen, and software executing from a non-transitory physical medium, the software providing a function for providing audio signal output in a connected voice-telephone call from the text words or phrases selected by a user.

4 Claims, 6 Drawing Sheets

TEXT INTERFACE DEVICE AND METHOD IN VOICE COMMUNICATION

BACKGROUND OF THE INVENTION

1. Field of the Invention

The present invention is in the area of hand-held communication devices enabled for voice communication

2. Description of Related Art

Many sorts of hand-held communication devices are known, including cellular telephones and Smart phones of many sorts, as well as PDAs and other portable devices enabled for voice communication as well as other functions.

There exists a population of persons who are speech-challenged or completely unable to speak for a variety of reasons. These persons are not served by the existing variety of voice-enabled hand-held communication devices. There exist, also, circumstances in the use of such devices in which persons with normal voice capability cannot or should not communicate with the device by speech. One example is while a part of an audience at a performance, like a movie theatre, wherein answering a telephone call by voice would be a disturbance to others in the audience. Another is for persons, such as executives, in meetings, where answering a call by voice might also be a disturbance to others in the meeting.

What is needed for speech-challenged people and for persons in circumstances where voice response is not desirable, is a hand-held device enabled for voice calls enabling users to select responses from pre-recorded words and phrases, or to enter text, either of which is immediately rendered as speech through text-to-speech software, to be immediately sent to the opposite party in a connected telephony call.

BRIEF SUMMARY OF THE INVENTION

In an embodiment of the invention a computerized communication device is provided, comprising a display screen, a mechanism for a user to select words or phrases displayed on the display screen, and software executing from a non-transitory physical medium, the software providing a function for providing audio signal output in a connected voice-telephone call from the text words or phrases selected by a user.

In one embodiment the device further comprises pre-recorded voice files associated with individual ones of the words or phrases displayed for the user to select, wherein the software provides the audio signal output by an association of the displayed text with the appropriate voice file, and plays the voice file as the audio signal output. Also in one embodiment the software comprises a text-to-voice application, and uses that application to provide audio signal output from text selected by the user.

In another embodiment the software comprises a voice-to-text application, uses that application to convert incoming audio signals of a connected voice telephone call to text, and displays that text as incoming words or comments in a first portion of the display screen. In yet another embodiment words or comments for selection by the user are displayed in a second portion of the display screen, and wherein, after the user selects a word or response motivated by displayed text in the first portion of the display screen, the next incoming audio signals, converted to text, replaces the previously displayed text from incoming audio signals.

In some embodiments the software comprises functions for parsing the incoming audio signals or the text derived from the incoming audio signals, and uses the results from the parsing to choose text to be displayed for the user to select for outgoing audio signals.

In another aspect of the invention a method is provided for implementing audio signal communication in a connected voice telephone call, comprising the steps of (a) displaying on a display screen of a computerized communication device text words or phrases for a user to select as output audio in the connected call; (b) converting the words or phrases selected by the user to audio signals; and (c) providing the audio signals converted from the words or phrases as audio signal output in the connected voice telephone call.

In one embodiment of the method the conversion of selected text to audio output is accomplished by selecting associated, pre-recorded voice files, and playing those files as output in the connected voice telephone call. Also in one embodiment conversion of selected text to audio output is accomplished by calling a text-to-voice application, and using that application to provide audio signal output from text selected by the user. In some embodiments incoming audio signals are converted to text by calling a voice-to-text application, and displaying that text as incoming words or comments in a first portion of the display screen, while in some other embodiments words or comments for selection by the user are displayed in a second portion of the display screen, and after the user selects a word or response motivated by displayed text in the first portion of the display screen, the next incoming audio signals, converted to text, replace the previously displayed text from incoming audio signals.

In some embodiments the device parses incoming audio signals or text derived from the incoming audio signals, and uses the results from the parsing to choose text to be displayed for the user to select for outgoing audio signals.

DETAILED DESCRIPTION OF THE INVENTION

Figure 1:
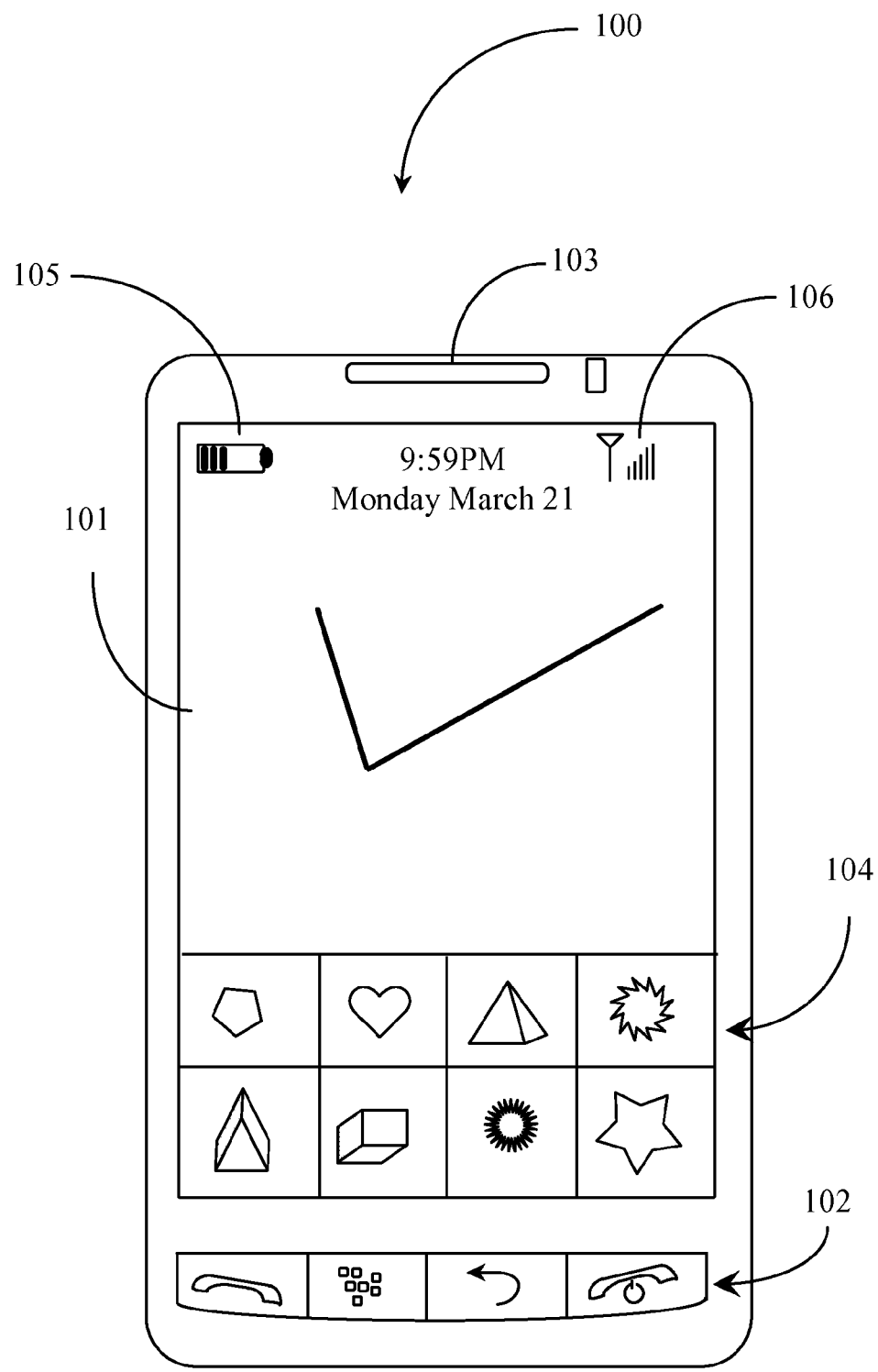
FIG. 1 is a face-on view of a typical hand-held telephony device with a touch screen.

FIG. 1 is a face-on view of a typical hand-held telephony device 100 with a touch screen 101. The device shown is a Blackberry™ cellular telephone device, and will be referred to repeatedly in descriptions that follow, although this particular device is not limiting in embodiments of the invention which may be practiced on many different makes and models of communication devices.

Device 100 includes many mechanisms and features that are common to such communication devices. For example element 103 is a camera lens, 105 is an iconic representation of battery life remaining for the device, 106 is the well-known "bars" representation for signal strength, 101 is a touch screen display area, icons 104 represent applications that may be booted by selecting an icon, and physical buttons 102 provide initiation of certain functions. From left to right in this example the buttons are for initiating a call, expanding the display of icons that represent applications that may be executed, moving back one position in a sequence of displays, and ending a call or turning off device 100.

The phrase "There's an App. For that" has become a very well-known phrase as more and more applications are developed and provided for hand held communication devices like the Blackberry™ device shown or the Apple iPhone™. In several embodiments the present invention is such an application which me be booted and executed on a communication device such as device 100 shown in FIG. 1.

As was stated above at the end of the Background section, what is needed in the art regarding the problems and unmet needs described in that section is an application for speech-challenged people and for persons in circumstances where voice response is not desirable.

It is well-known in the art that many hand-held communication devices are enabled for texting, and these are certainly useful for speech-challenged persons and for persons attending, for example, a performance of some sort where explicit speech would not be desirable. One problem with this is that not all devices are enabled for texting, some persons prefer to not pay for the sometimes considerable extra charges for texting services, and some people just are not adept at entering the necessary characters from a usually undersized keyboard or entry interface. Yet another problem is that the user does not always have a choice. A person in a theatre, for example, may have set his or her device for "vibrate" to avoid disturbing persons in the immediate vicinity, but may receive a voice call and recognize that it is a very important call, and should be answered immediately.

Figure 2:
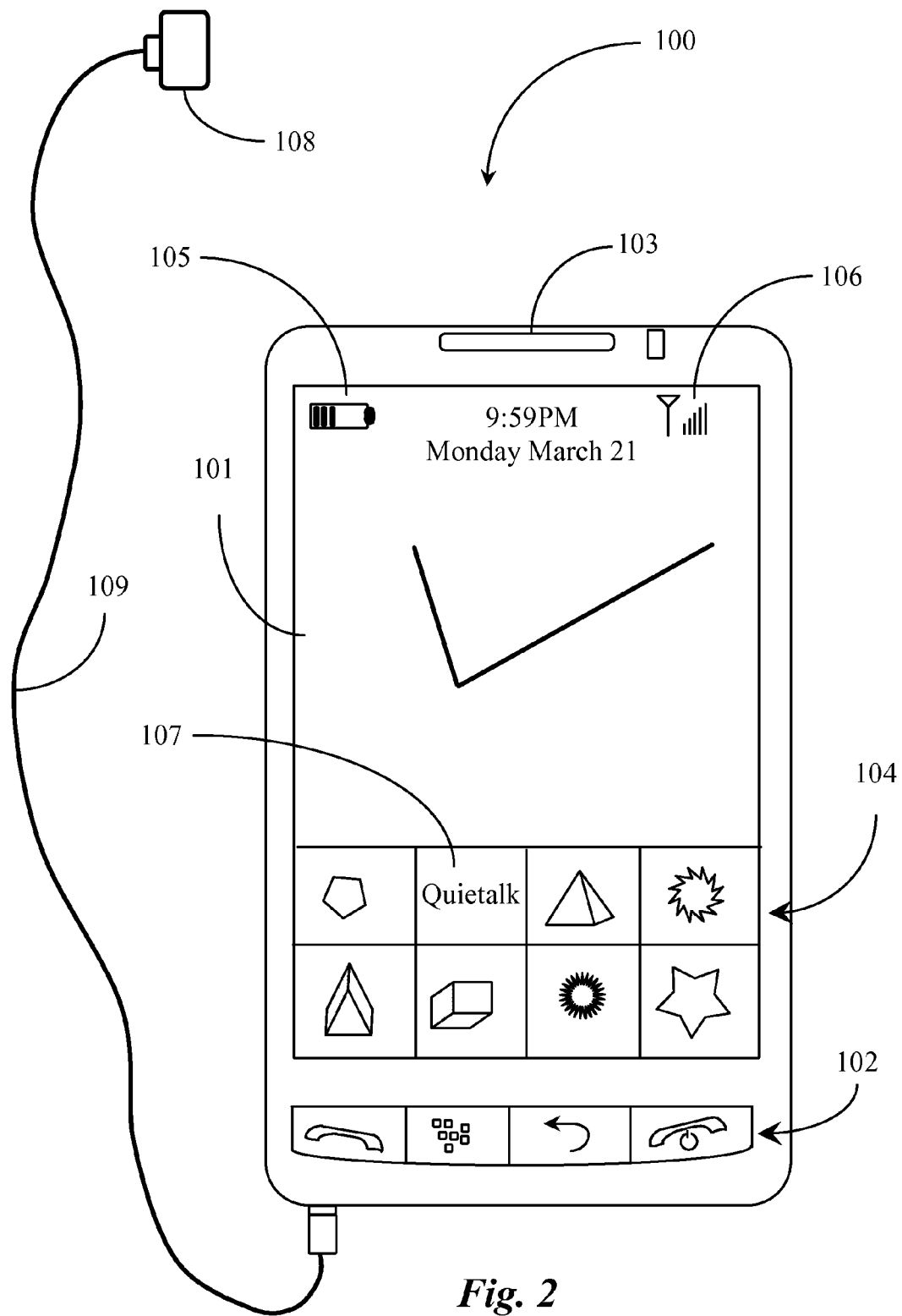
FIG. 2 is a face-on view of the device of FIG. 1 including a link icon for opening an application according to an embodiment of the present invention.

FIG. 2 is a face-on view of the device of FIG. 1 showing an icon as a text "Quietalk" in an embodiment of the invention. Selecting this icon boots the Quietalk application in an embodiment of the present invention. The device in FIG. 2 is shown with an ear bud 108 attached by a cable 109. If the device is BlueTooth™-enabled the user may have an earpiece that connects wirelessly to the device without a cable. In either case the voice incoming from a caller will not be a disturbance to persons in the immediate vicinity of the user of the device, and the user, in this case a hearing person, desiring to carry on a voice call quietly would be sure to enable and use the ear bud in this embodiment, as this would prevent incoming voice from disturbing persons in close proximity.

Figure 3:
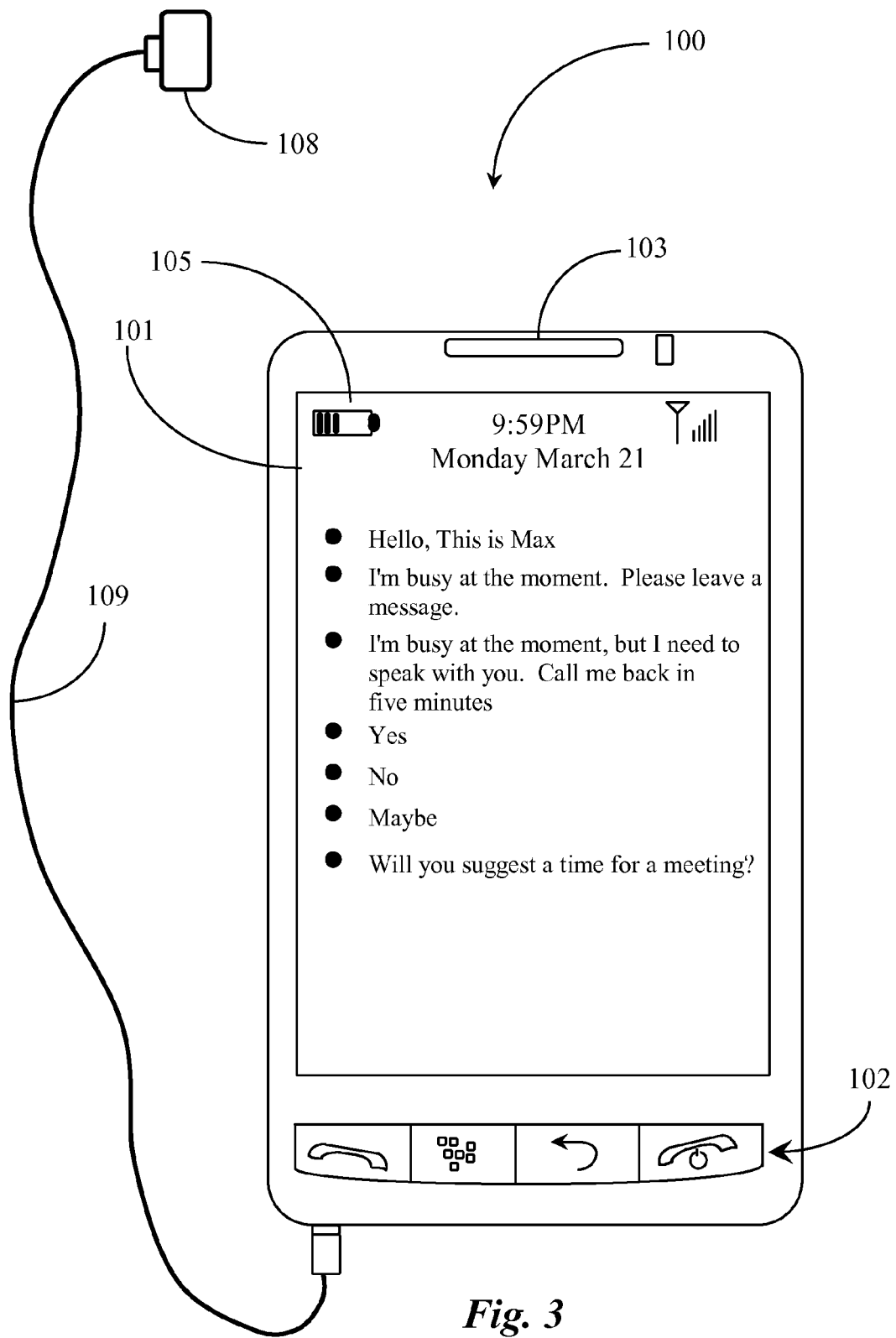
FIG. 3 is a face-on view of the device of FIGS. 1 and 2 with a top-level display on the touch screen provided for an application in an embodiment of the present invention.

FIG. 3 is a face-on view of the device of FIG. 2 with a first screen displayed as a result of booting the Quietalk application in this first embodiment. In this example the user may have connected to an incoming call by use of the "answer" pushbutton leftmost of buttons 102, but has not yet made a statement to the caller, (and either cannot or does not want to speak). The display in FIG. 3 offers a variety of responses the user may select by touch with a touch screen, or may select by scrolling a pointer and clicking in an enabled computerized device like a laptop computer or other device so enabled. The requirement is simply that the user is able to select a response by reading the text of the offerings of responses.

It will be apparent to the skilled person that the selection of responses shown in FIG. 3 is a very limited set, and that many more responses may be presented for selection. For example, responses may be displayed in one embodiment by categories, such as "how do I feel", "How are things going" and so forth, that when selected may present a new list of responses to select, such as "lousy" or "magnificent". The set of responses will always be finite and limited, but can cover quite a large number of situations and incoming comments or queries. And the depth of hierarchy for potential responses is a matter of design.

There is no specific limit on the text selections that may be displayed, and in one embodiment portions or the entirety of a texting dictionary may be displayed, again perhaps in a hierarchical manner. It is well known that texters have developed a great many abbreviations that make the entry of text quicker and more efficient, and many such abbreviations may be used in the Quietalk application in different embodiment of the invention. One such dictionary is "Texting Dictionary of Acronyms" by Randall C. Manning, Copyright 2009, available from C. G. Publishing.

Now, when the user connects to the incoming call the conventional process is that the connection provides the two-way voice path for the call. In this particular case, however, the user has booted the Quietalk application previously, or may have a device in which Quietalk is the default operation for the device.

Figure 4:
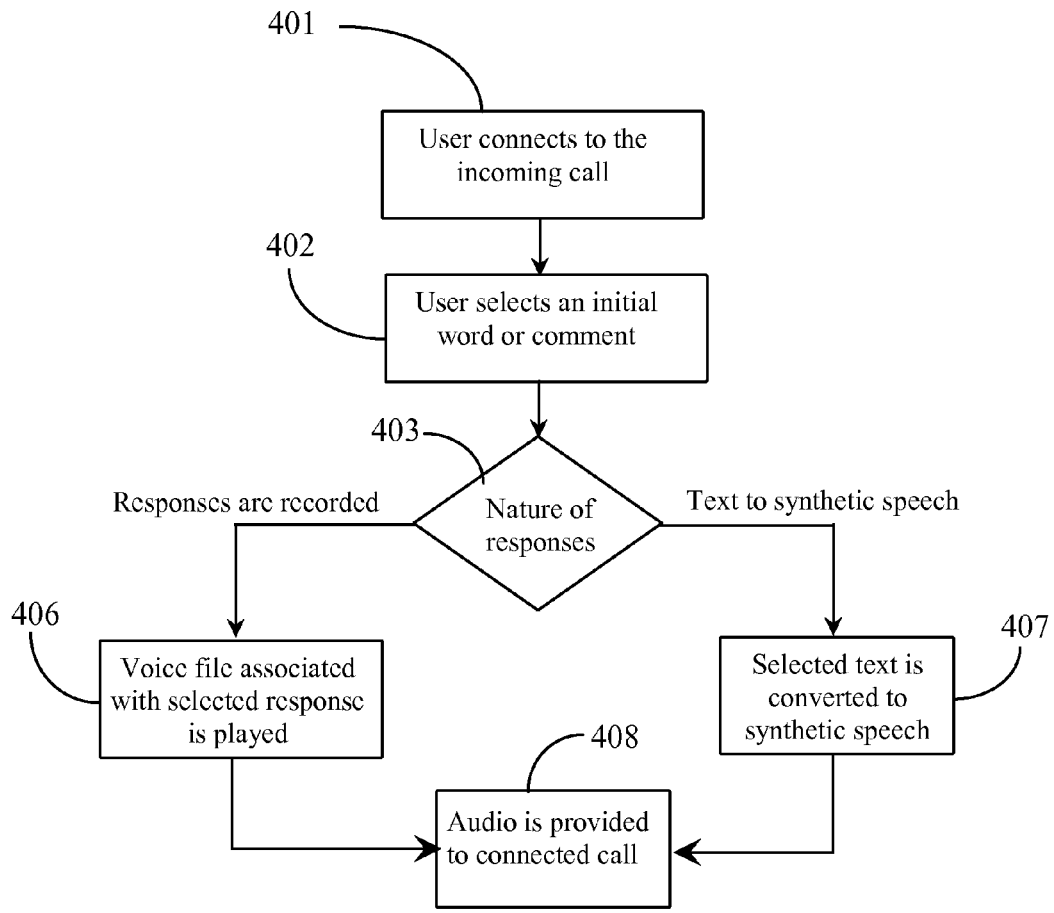
FIG. 4 is a flow chart illustrating steps in practicing the invention in specific embodiments.

FIG. 4 is a flow diagram for this process in two specific embodiments. Step 401 is the point at which the user senses the alert of an incoming call and connects. At step 402 the user selects the initial comment. It may be a greeting such as "Hello, this is Max", or depending perhaps on Caller ID, which may be displayed in any number of ways, the user may select something like "I'm busy at the moment, but please leave a message".

There are two ways in which the user may provide voice responses and comments in the ensuing conversation without having to speak. In one embodiment the user, who may be a speaking person, may have recorded voice files for each of the selectable text responses. The user may also have had someone else record the voice files for the selectable responses. In one embodiment the user may purchase, along with the Quietalk application, a relatively large set of voice response files associated with the text versions, and there will be a configuration function for the user to configure the responses he or she wishes to use. The configuration function may provide for installing one or more sets of files, ability for the user to create his or her own sets of files, and ability to enter text and record responses. There are a wide variety of options for configuration. This works also in the embodiments in which texting acronyms and abbreviations are displayed, as the SW can associate selected text entities with the correct recorded voice file.

Referring back to FIG. 4, if it is determined at step 403 that responses are recorded, the application goes to step 406 and a voice file is played for the text selected. At step 408 the voice rendition is provided to the connected voice call.

If it is determined at step 403 that the version of the Quietalk application uses text-to-speech, the selected text, if in fact full text, is provided to a text-to-speech application at step 407, and the generated voice from text is provided at step 408 to the voice call. In the specific case of use of abbreviations and acronyms, there is an addition step associating the abbreviation or acronym with a full-text version, and then providing the full text to the text-to-speech generator.

The variety and depth of conversation that may be accomplished is heavily dependent on the variety and depth of text that is provided for a user to select, and the arrangement of the text that may make it easier to find and select. In some embodiments there may be some analysis of incoming information (from the caller) that may alter the display for response, such as providing a single response, or a short selection of responses. Moreover, the configuration function may well allow the user to develop his/her response sets and operation over time. In some embodiments caller ID (or lack of same) may provide appropriate responses, or a fixed response, to the caller.

The embodiments discussed thus far are useful for persons who may be hearing persons, but speech-challenged, and for persons who can both hear and speak, but want such an application for certain circumstances in which they may wish to avoid speaking aloud.

Figure 5:
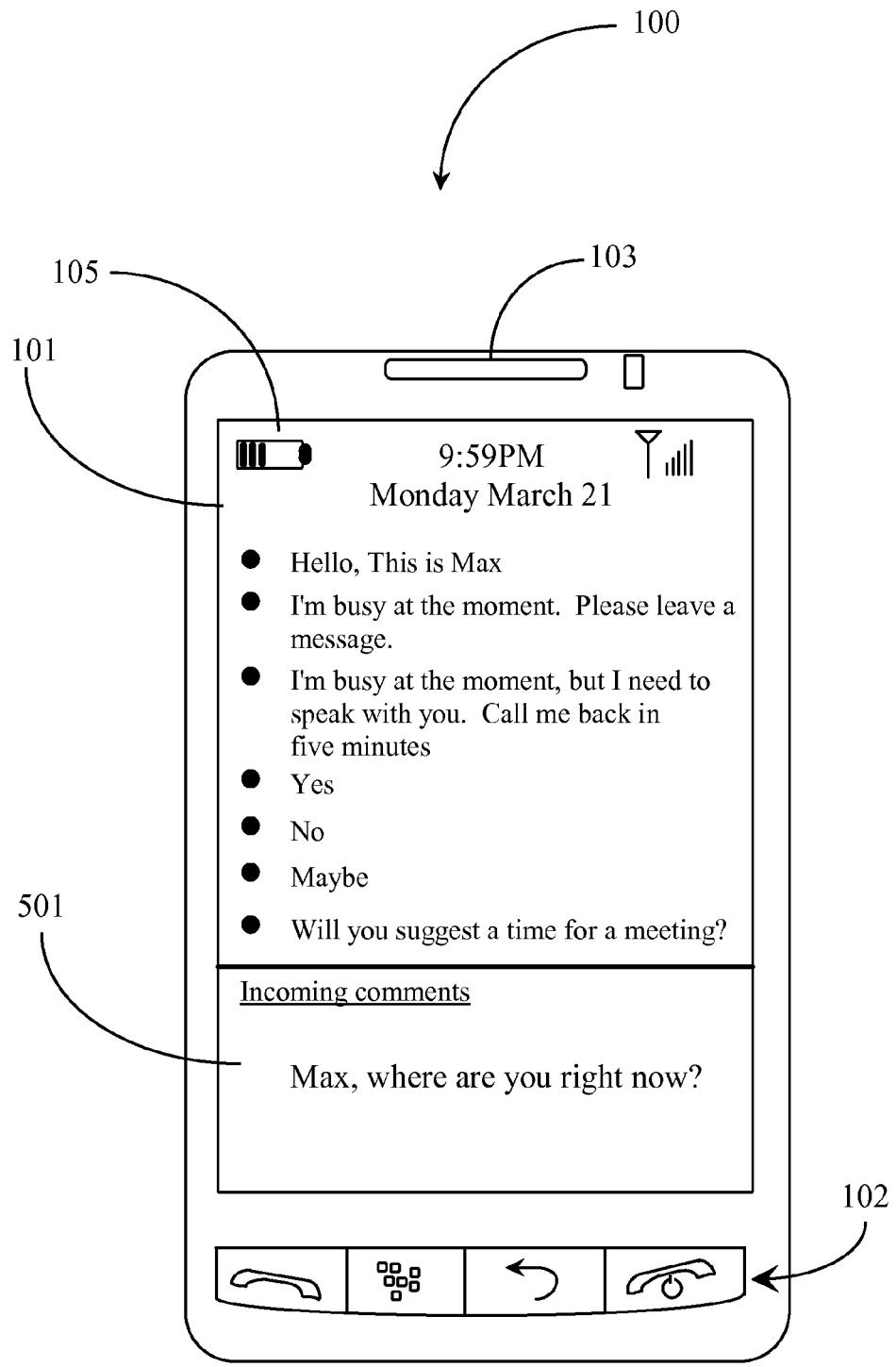
FIG. 5 is a face-on view of a display operative in a specific embodiment embodiment.

There are persons who are also may be hearing challenged, but have adequate eyesight for use of text selection as described above to provide voice responses in a voice call. For this and some other circumstances another feature is provided for Quietalk. That feature is a speech-to-text feature that receives the incoming voice and converts it to text for the user, and displays the text in a portion of the display screen. FIG. 5 is a face-on view of a display that may be operative in this embodiment.

In FIG. 5 the selectable responses for the user are still available, but restricted in this version to an upper portion of the screen. A lower portion of the screen is reserved and marked for incoming comments. The incoming comments are text developed from incoming voice through a voice-to-text application called by Quietalk in this particular embodiment. In some embodiments using the voice-to-text feature the text versions of incoming comments are mined for keywords and phrases, and the result of the text mining is used to present word and comment selections for the user to select as outgoing comments.

There are thus several variations of features for persons of different needs in the invention:

1. For persons who desire to leave a phone on when in a situation where answering and speaking would be a undesirable and rude to others in close proximity, the phone needs a vibrating or other quiet-alert for an incoming call, an ear bud or equivalent device either cable-connected or BlueTooth™, text selections for the user to select comments and responses, which are converted to audio signals by either a selection of associated, pre-recorded voice files, or by a text-to-speech application, and provided as audio output in the connected telephone call. This arrangement also works for persons who are hearing capable but cannot speak for one reason or another.
2. For persons who are hearing-challenged, but speech-capable the device needs to covert incoming audio to text through a callable voice-to-text application and present the text on the screen. The user can then respond by natural voice.
3. For persons who are both hearing-challenged and speech-challenged, the device needs to use both voice-to-text for incoming audio, displaying the text for the user, and text-to-voice with selections for the user, which are then converted to audio signals for output either by selecting pre-recorded voice files or by a callable text to voice application.

The embodiments described thus far use SW executing on a digital appliance, such as a cell phone, and iPad, a laptop computer, and the like. In some of these embodiments one or both of text-to-speech and speech-to-text applications are used, and other applications display text and abbreviations for selection, and associate in various ways. This can be challenging for many communication devices, and the level of functionality may be limited.

Figure 6:
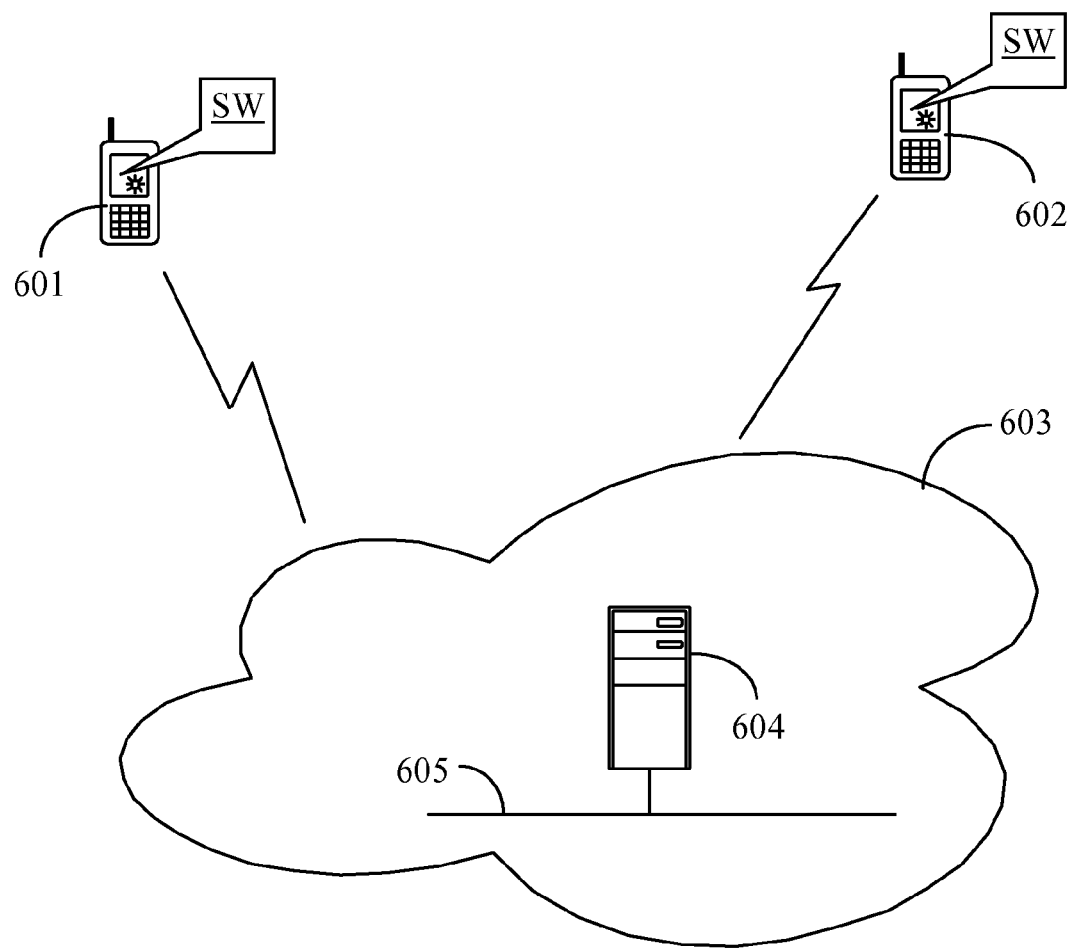
FIG. 6 illustrates an implementation using a server in a network for performing some of the functions in an embodiment of the invention.

FIG. 6 illustrates a server 604 connected by lines 605 in a network indicated by cloud 603, and two wireless communication devices 601 and 602 enabled to operate over network 603. Network 603 may be the well-known Internet network, a PSTN network, a wireless network, and is in many cases a combination of such networks. Gateways ISPs, and the like are well-known in the art and are not shown in this diagram. The essential arrangement in this embodiment is that wirelessly operating communication devices 601 and 602 may connect to one another through server 604 in network 603. One or both devices 601 and 602 may be known to server 604, and one or more persons using these devices may subscribe to services of 604.

Assume for the sake of illustration that a person operating device 601 is a speech-challenged person, and subscribes to services of server 604. In this embodiment when a caller places a voice call to the user of device 601 that call goes first to server 604, which then opens a new channel to device 601. In this way, intensive operations such as voice-to-text and text-to-voice may be executed for the subscriber at server 604, and many more services may be provided as well. In this way a much richer experience may be provided, because of the ability to provide considerably more computing power at server 604 than in device 601 or 602.

It will be apparent to the skilled person that the embodiments of the invention described above may be implemented in a variety of ways and that changes may be made in various of the embodiments without departing from the spirit and scope of the invention. The invention is limited only by the claims that follow:

The invention claimed is:

1. A computerized communication device comprising:
   a touch display screen, a data repository, voice telephony circuitry and voice telephony functions, and an earphone output coupled to an earphone; a data repository; and
   software executing from a non-transitory physical medium, the software providing an interactive interface on the display screen including a command selection, initiated via interaction by a user with the display screen, activating a quiet-mode application;
   wherein the device operating in quiet mode, upon a user connecting to an incoming voice call from a caller;
      (i) receives audio signals in the voice call from the caller, converts only those audio signals to text and presents the text in a first region of the display;
      (ii) mines the converted text in the first region of the display for keywords or phrases, and the software selects specific second words or phrases from the database, related to the converted text, and displays the second words or phrases in a second region of the display screen, individual ones of the second words or phrases selectable by the user;
   and wherein one second word or phrase, displayed in the second region of the display, is selected by the user to make a response in the voice call, while viewing the converted text displayed in the first region, and the quiet-mode application checks whether there is in the data repository a recorded sound file associated with the selected second word or phrase, and if so, plays the associated recorded sound file in the connected telephone call, and if there are no pre-recorded sound files associated with the selected second word or phrase, the software converts the text of the selected second word or phrase into synthetic speech, which is played to the connected telephone call.

2. The computerized communication device of claim 1 wherein the selectable second words or phrases displayed in the second region of the display comprise a hierarchical system wherein the user sorts among a further variety of words or phrases displayed from the data repository, and selects one of the further words or phrases to be rendered as a sound file from the database or synthetic speech in the connected voice call.

3. A method comprising:
(a) connecting to a voice call implemented on a computerized communication device, the device including a data repository and voice telephony circuitry and voice telephony functions,
(b) converting only voice input from the caller, by software stored and executed from a non-transitory physical medium on the communication device, to first text and the first text is displayed in a first region in a touchscreen display;
(c) mining the converted text in the first region of the display for keywords or phrases, and selecting specific second words or phrases from a database, related to the converted text, and displaying in a second region of the touch screen display a variety of second text incorporating individually selectable words or phrases to make a response in the voice telephone call;
(d) selecting one of the words or phrases in the second text by a user;
(e) checking, by the software, whether there is in the data repository a recorded sound file associated with the selected word or phrase, and if so, playing the associated recorded sound file to the connected voice telephone call; and
(f) if there are no pre-recorded associated sound files associated with the selected word or text, converting, by the software, the text of the selected word or phrase into synthetic speech, and playing the resulting synthetic speech in the voice telephone call.

4. The method of claim 3 wherein the second text incorporating individually selectable variety of words or phrases displayed in the first region comprise a hierarchical system wherein the user sorts among a further variety of words or phrases displayed from the data repository, and selects one of the further words or phrases to be rendered as a sound file from the database or synthetic speech in the connected voice call.

* * * * *